Patented May 17, 1932

1,858,919

UNITED STATES PATENT OFFICE

WALTER CHARLES D'LENY AND JAMES RITCHIE PARK, OF NORTON-ON-TEES, ENGLAND, ASSIGNORS TO IMPERIAL CHEMICAL INDUSTRIES LIMITED, OF LONDON, ENGLAND, A BRITISH COMPANY

PURIFICATION OF GASES CONTAINING HYDROGEN SULPHIDE

No Drawing. Application filed April 16, 1930, Serial No. 444,869, and in Great Britain April 26, 1929.

It is known that chemical reactions between gases and liquids can be carried out by exposing the gases to continuous liquid films obtained by allowing the liquid to fall under gravity over a solid surface (British Patent No. 279,526). We have now found that this process forms an excellent manner of carrying out the purification of gases by treating the gases with an alkaline suspension of ferric oxide or hydroxide. The invention thus consists in bringing the gas to be purified in contact with continuous liquid films carrying ferric oxide or hydroxide in suspension. The process according to the invention presents the advantage over the known process in which a gas is treated with liquor in the form of a thin suspension or slurry in a packed tower, that the tower does not become fouled because of the collection of solid matter in the packing.

The invention also consists in regenerating the spent liquor by exposing it in the form of a film to action of air. The invention further consists in a process in which the absorption of hydrogen sulphide is facilitated by the presence of a nickel compound.

Example 1

Coal gas, from which it is desired to remove cyanogen and hydrogen sulphide, is passed up a tower the walls of which are irrigated by a falling film of a 2 per cent sodium carbonate solution carrying .02 gm. mols per litre of ferric oxide in suspension. The gas leaving at the top of the tower is substantially free form the named impurities, which are absorbed by the liquor. The liquor collected at the base of the tower may be recirculated to the top, and a part continuously withdrawn for regeneration. A corresponding quantity of regenerated liquor is added to maintain the required amount of liquor in circulation. Regeneration of the liquor is conveniently effected by aeration in the standard manner or in a tower through which a current of air passes in contact with the spent liquor in the form of a falling film.

Example 2

The purification of coal gas and the regeneration of the ferric oxide suspensions are carried out in a continuous process by means of two towers placed one above the other. Coal gas enters at the base of the upper tower and passes upwards in contact with the falling film of liquid as in Example 1. The spent liquor is conveyed from the base of the upper tower to the top of the lower tower and caused to form a continuous falling film on the walls of the lower tower. A stream of air passes upwards through the lower tower. From the base of the lower tower the regenerated liquor is carried to the top of the upper tower.

Nickel salts may be used with ferric hydroxide to actuate the latter as we have found that the absorptive power of such a suspension is increased by the addition of nickel salts. It is not economical to use a large proportion of nickel for this purpose and on the other hand a very small quantity is not sufficient to give the desired result. We have found that good results are obtained by using from 10–25 gram molecules of nickel for every 100 gram molecules of iron in suspension.

Example 3

Coal distillation gases containing 0.15 per cent by volume of hydrogen sulphide were passed through an absorption tower in contact with a solution of 0.15 gm. molecules per litre of sodium carbonate containing 0.02 gm. molecules of ferric hydroxide and 0.005 gm. molecules nickel carbonate per litre. The gas rate was 150 litres per hour and the liquor rate 5 litres per hour and the washed gases issue from the tower substantially free from hydrogen sulphide.

In an exactly similar experiment in which the nickel carbonate was omitted, the gases issuing from the tower contained considerable quantities of hydrogen sulphide, as was shown by the test reaction with lead acetate solution.

We declare that what we claim is:—

The process of purifying gas containing hydrogen sulphide which comprises bringing the gas into contact with an alkaline suspension of a mixture of iron and nickel compounds containing 10–25 gram molecules of nickel per 100 gram molecules of iron.

In witness whereof, we have hereunto signed our names this 3rd day of April, 1930.

WALTER CHARLES D'LENY.
JAMES RITCHIE PARK.